United States Patent Office 2,887,410
Patented May 19, 1959

2,887,410

PROCESS FOR THE DRESSING OF LEATHER

Wilhelm Graulich, Leverkusen-Bayerwerk, Gustav Mauthe, Opladen, and Kurt Eitel, Leverkusen, Germany, assignors to Farbenfabriken Bayer Aktiengesellschaft, Leverkusen, Germany, a corporation of Germany No Drawing. Application January 21, 1955
Serial No. 483,432

Claims priority, application Germany January 21, 1954

4 Claims. (Cl. 117—142)

This invention relates to a process for the dressing of leather.

It has already been proposed in British specification No. 633,631 to add plasticizers to polyvinyl chloride emulsions to be used for dressing leather. It has also already been suggested (cf. Das Leder (1951), page 52—Neuere Entwicklungen auf dem Deckfarbengebiet) that, instead of softening being effected with plasticizers, the required variation in the degree of elasticity and softness may be obtained by mixing relatively hard and relatively soft polymer dispersions (for example by mixing dispersions having Defo hardnesses of 6000 and 800). All these polymer dispersions have a definite Defo value, i.e. coherent films with a definite structural strength are formed when they are cast on to glass plates and subsequently dried (with heating, if desired).

It has now been found that copolymer emulsions derived from butadiene and acrylonitrile constitute excellent auxiliaries for dressing leather if the molecular weight of the said copolymer has been kept so low by intensive control that the copolymer, when isolated, has an oily-viscous consistency so that its hardness can no longer be determined with a Defo measuring instrument, i.e. one having a Defo hardness of 0 or less. It has surprisingly been shown that even mixtures of these products with emulsions of polymers having a Defo hardness of, for example 6000, produce coating layers without the slightest tackiness when such mixtures are used for dressing leather, although these products have a glue-like stickiness when they are isolated. In addition, when used alone for the bottoming of heavily buffed very absorbent leather, they produce an excellent seal without enlarging the grains in the way which is frequently unavoidable when polymer dispersions having definite Defo values are used.

The viscous copolymers for use in the process of the invention can be prepared in emulsion form by using conventional methods of emulsion polymerization with intensive control as hereinafter defined; it is desirable for the amount of the acrylonitrile incorporated in the final product not to exceed 50%, calculated on the final product. It is further possible for a third vinyl component to be used at the same time; examples of such components are styrene, acrylic ester, methacrylic ester, asym. dichloroethene and substituted styrenes.

By the expression "intensive control" as used herein is meant the addition of a higher proportion of a substance with a controlling action (cf. Graulich and Becker, Makromolekulare Chemie, vol. 3 (1949), pp. 53–77, particularly page 54, 3d paragraph).

The present invention, then, provides a process for dressing leather, which comprises dressing the leather with an aqueous emulsion of a copolymer derived from butadiene and acrylonitrile and if desired a third vinyl component, the molecular weight of said copolymer having been kept so low by intensive control as hereinbefore defined that the copolymer has an oily-viscous consistency.

The emulsion of the copolymer may be used in accordance with methods usual in the leather industry, the so-called collodion dressing method, or the dressing method, wherein the desired amount of coating dye is added in an aqueous medium; the leather produced has only fine grains, such as could otherwise only be produced from unbuffed skins.

The following example further illustrates the invention without, however, limiting the scope thereof; the parts given are by weight.

*Example*

A box cow hide prepared by semi-chrome tanning sun-dried African hides has the buffing dust removed by brushing after the buffing operation. The resulting leather is then treated with a coating dye liquor of the following composition:

100 parts of a conventional commercial coating dye paste based on caesin in paste form,
100 parts of a copolymer, derived from butadiene and acrylonitrile, which has a viscous-oily consistency,
4 parts of a highly concentrated conventional commercial aniline dyestuff, and
300 parts of water.

This bottoming is absorbed well by the leather and flattens the surface without cracking the grain. The leather thus bottomed may be given a further velvet coating by treating it with the following coating dye liquor:

100 parts of a conventional commercial casein coating dye in paste form,
2 parts of a highly concentrated aniline dyestuff,
100 parts of an aqueous about 35–40% emulsion of a copolymerizate from 40 parts of acrylonitrile, 40 parts of butadiene and 20 parts of styrene, prepared by polymerizing said products in aqueous emulsion using as emulsifier a paraffin oil sulfonate and as catalyst a combination of potassium persulphate and triethanolamine,
20 parts of a butadiene-acrylonitrile copolymer which has a viscous-oily consistency,
20 parts of a 10% casein solution saponified with ammonia, and
400 parts of water.

The material thus coated is dried, and is then ironed on a hydraulic press at 60° C. and 200 atmospheres pressure. It is then sprayed with the last-mentioned coating dye liquor, which has been mixed with twice its quantity of water. Finally, the leather is treated with a thin coating of a conventional clear collodion lacquer, or an ironing glaze with an albumen-casein-wax base, which is thereafter hardened. The leather is dried and ironed on a hydraulic press at 50° C. at a pressure of 150 atmospheres. The buffed box leather finished in this manner has only fine grains, is resistant to cold and ageing, and has a very uniform and even coating.

The butadiene-acrylonitrile copolymer which is used can be prepared as follows:

4 parts of the sodium salts of the sulphonic acids of long-chain paraffins,
0.05 part of sodium hydroxide,
0.3 part of sodium pyrophosphate, and
0.5 part of potassium persulphate, are dissolved in 180 parts of water.

60 parts of butadiene and 40 parts of acrylonitrile are emulsified in this solution under its own pressure in an autoclave, the said acrylonitrile containing 6 parts of diisopropyl xanthic disulphide as a controlling agent.

Finally, the mixture is activated with 0.25 part of triethanolamine and polymerized at 40° C. until about 80% of the monomers have reacted. If the polymerization should slow down or stop it is started again by adding more persulphate. The substantially 30% emulsion which is obtained is stabilized with 1% of a dispersion of di-tert-butyl-1.5-p-cresol, calculated on the test substance.

Alternatively, it is possible to use a copolymer derived from butadiene, acrylonitrile and styrene, which is prepared as follows:

50 parts of butadiene,
    40 parts of acrylonitrile,
    10 parts of styrene, and
    5 parts of dodecyl mercaptan, are emulsified in the solution described above. The emulsion is polymerized in the same way as the butadiene-acrylonitrile copolymer, to give a yield of about 100%, and is stabilized as described above.

We claim:

1. A process of dressing leather wherein the leather is first coated with a composition containing a single copolymer, said copolymer derived essentially from butadiene and acrylonitrile, said copolymer having an oily-viscous consistency and a Defo hardness no greater than 0.

2. A process of dressing leather wherein the leather is first coated with a composition containing a single copolymer, said copolymer derived essentially from butadiene, acrylonitrile and a third vinyl component, said copolymer having an oily-viscous consistency and a Defo hardness no greater than 0.

3. A leather dressed with a coating of a composition containing a single copolymer, said copolymer derived essentially from butadiene and acrylonitrile, said copolymer having an oily-viscous consistency and a Defo hardness no greater than 0.

4. A leather dressed with a coating of a composition containing a single copolymer, said copolymer derived essentially from butadiene, acrylonitrile and a third vinyl component, said copolymer having an oily-viscous consistency and a Defo hardness no greater than 0.

References Cited in the file of this patent

UNITED STATES PATENTS

| | | |
|---|---|---|
| 2,481,933 | Kirby et al. | Sept. 13, 1949 |
| 2,552,904 | Newberg | May 15, 1951 |
| 2,599,581 | Perkins et al. | June 10, 1952 |
| 2,614,094 | Wheelock | Oct. 14, 1952 |
| 2,630,420 | Gleim | Mar. 3, 1953 |
| 2,635,055 | Figdor | Apr. 14, 1953 |
| 2,651,856 | Newton | Sept. 15, 1953 |
| 2,686,764 | Geister et al. | Aug. 17, 1954 |

FOREIGN PATENTS

| | | |
|---|---|---|
| 633,631 | Great Britain | Dec. 19, 1949 |
| 678,614 | Great Britain | Sept. 3, 1952 |